No. 884,066. PATENTED APR. 7, 1908.
C. E. L. BROWN.
AUTOMATIC ALTERNATING CURRENT CONTACT APPARATUS.
APPLICATION FILED NOV. 7, 1903.

2 SHEETS—SHEET 1.

Witnesses:

Inventor:

No. 884,066. PATENTED APR. 7, 1908.
C. E. L. BROWN.
AUTOMATIC ALTERNATING CURRENT CONTACT APPARATUS.
APPLICATION FILED NOV. 7, 1903.
2 SHEETS—SHEET 2.
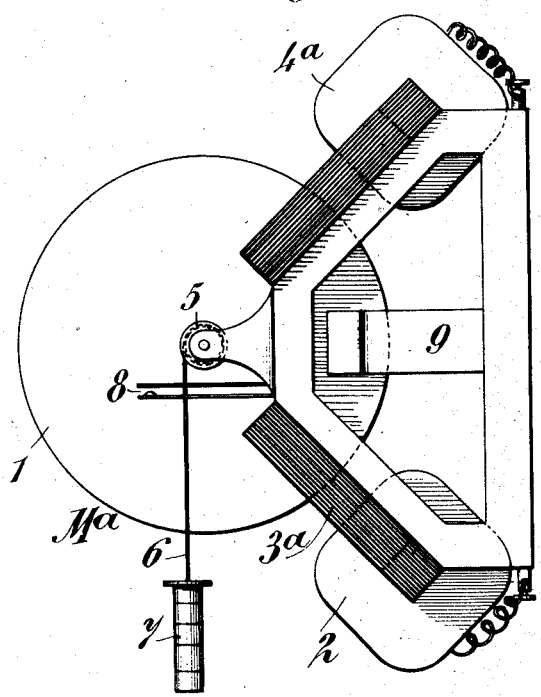
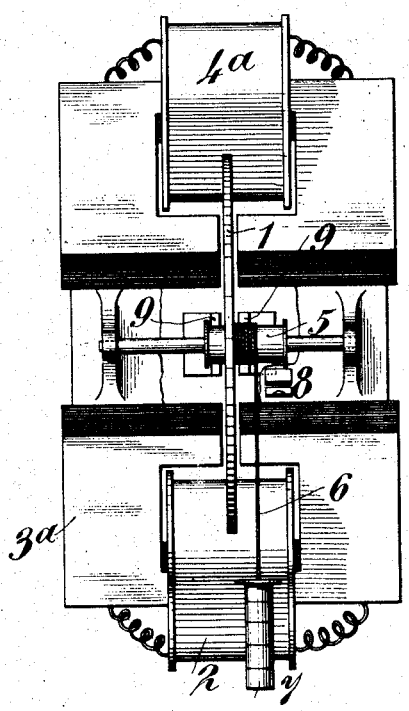
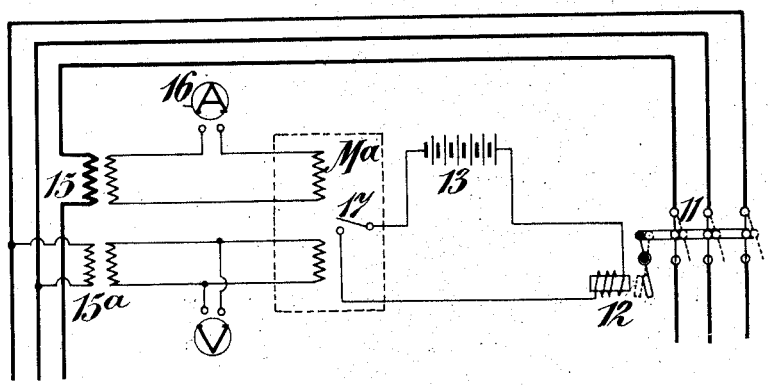

UNITED STATES PATENT OFFICE.

CHARLES EUGEN LANCELOT BROWN, OF BADEN, SWITZERLAND, ASSIGNOR TO ACTIEN-GESELLSCHAFT BROWN, BOVERI & CO., OF BADEN, SWITZERLAND, A FIRM.

AUTOMATIC ALTERNATING-CURRENT CONTACT APPARATUS.

No. 884,066.  Specification of Letters Patent.  Patented April 7, 1908.

Application filed November 7, 1903. Serial No. 180,201.

*To all whom it may concern:*

Be it known that I, CHARLES EUGEN LANCELOT BROWN, a subject of the King of Great Britain, residing at Baden, in Switzerland, have invented new and useful Improvements in Automatic Alternating-Current Contact Apparatus, of which the following is a specification.

In many cases it is advisable, in electric circuits, especially in high-tension circuits, to use special automatic cut-outs instead of the well known fuses. It is necessary, of course, that such cut-outs are so made that the cutting of the current is done in the same way as by fuses, i. e., it is necessary to arrange them in such a way that they are automatically disconnected as soon as the current attains a predetermined intensity at or within a predetermined time.

Such a disconnecting device forms the object of the present invention. It permits of predetermining at will both the intensity at which contact shall be made, and the time (reckoned from the moment when this intensity is reached) at or within which this takes place.

Figure 1:
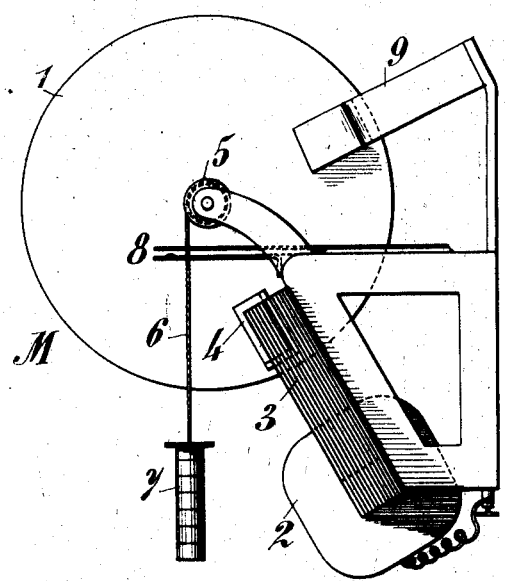
Figure 2:
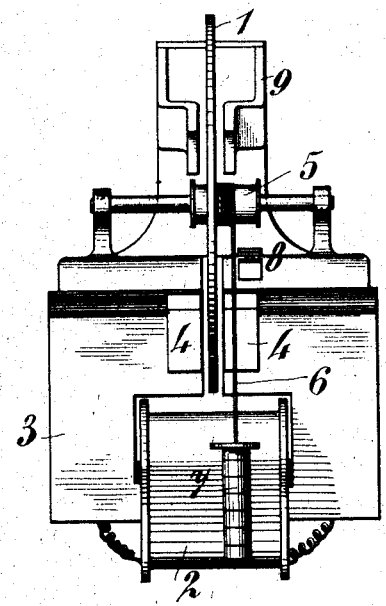
Figure 3:
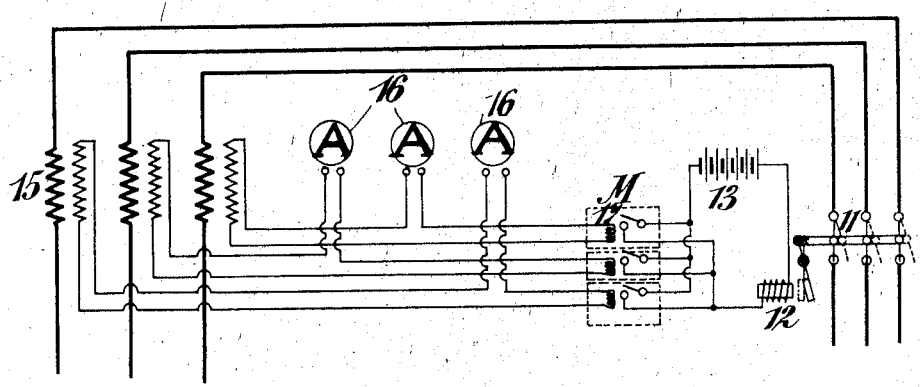

Referring to the drawings in which like parts are similarly designated—Figure 1 is a front view, and Fig. 2 a side view (taken at right angles) of the device for ordinary currents. Fig. 3 is a plan of a three-phase circuit containing three such devices (one in each phase) and showing the way in which they operate in connection with cut-outs. Figs. 4 and 5 are side and front views (taken at right angles to each other) of a device shown in Figs. 1 and 2, but arranged for reverse currents. Fig. 6 is a corresponding plan of connections showing one of the devices placed in one of the phases of a three-phase circuit.

Referring to Figs. 1 and 2 of the accompanying drawings, the following is a description of one of the ways of carrying the invention into effect: A disk 1 of conducting but non-magnetic material is so placed between the poles of a laminated horse-shoe iron core 3, that it is capable of rotating between these poles, between which and the sides of the disk but a small space is left. The ends of the poles are partly provided with a copper winding 4 of very small resistance which is short-circuited on itself. The laminated iron core carries a coil 2 which is connected, either directly or indirectly, by means of a current transformer, with the circuit intended to be broken. The poles of a permanent magnet 9 are placed on each side of the disk, in a similar manner to those of the before-mentioned iron core. Such a structure may be termed an induction motor. On the axis of the disk a small drum 5 is mounted, on which, when it turns, a cord 6 carrying a weight 7 is wound. Near the axis, next to the cord, there is a contact spring 8 placed in a separate circuit, which latter is closed by the weight 7 touching the spring 8.

The manner in which the device operates is as follows: The alternating current electro-magnet composed of the laminated iron core with short-circuited copper winding before described produces a turning moment on the axis of the disk, the strength of which depends on the intensity of the current in the main circuit. This turning moment is counteracted by the weight suspended by the cord on the drum mounted on the axis of the disk. The disk will therefore be made to rotate as soon as the turning moment produced by the main circuit become stronger than the weight. In revolving, the disk winds up the cord carrying the weight and the latter, as soon as it touches the contact spring, closes the separate circuit in which the latter is placed and by means of which a cut-out is disconnected. According to the size of the weight, the intensity required to produce a sufficient turning moment for raising it varies, and moreover, the time—from the moment when the intensity becomes strong enough to raise the weight—until the weight reaches the contact spring also varies according to the length of the cord. By regulating the length of the cord and the size of the weight, it is therefore possible to predetermine at will both the intensity at which contact shall be made, and the time at or within which this result is produced. The permanent magnet is provided for damping the rotation of the disk and to prevent the same from oscillating.

In Fig. 3 the device is shown applied to a three-phase circuit, a separate disconnecting device being provided for each phase. In this figure 15 stands for the current transformers, 16 for the ammeters A, M for the disconnecting devices, 17 for the contacts placed in a separate circuit, 13 for the apparatus providing this latter circuit with current, 12 for the magnet coil acting on the cut-out 11 when the contacts 17 are closed. The conductors for the contacts are connected in parallel, so that the closing of one of the contacts suffices for operating the cut-out.

If the device above described is intended to be used for reverse current, two electro-magnets are placed so as to act on the disk; these electro-magnets have cores of laminated iron, but their poles are not, as in the previous case, provided with a short-circuited copper winding. The coil of one of them is connected with the main circuit, or, by means of a current transformer, with a circuit depending on the main circuit, whereas the other coil is placed in a shunt for voltage across the other two phase leads. An arrangement of this kind is illustrated by Figs. 4 and 5, in which 1 stands for the disk capable of revolving, 2 for one of the coils, 3$^a$ for the corresponding iron core, 4$^a$ for the other coil, 5 for the drum, 6 for the cord and 7 for the weight. Fig. 6 shows the connections of such a device as placed in a three-phase circuit, the connections being shown but for one phase, 15 stands here for a current transformer, 15$^a$ for a transformer, 16 for an ammeter A, V for a voltmeter, M$^a$ for a disconnecting device for reverse current, 17 one of the contacts intended to be closed by the latter, 13 for the apparatus producing current for the separate circuit, 12 for a magnet coil acting on the cut-out 11.

The device for reverse current operates as follows: The two electro-magnets both produce a turning moment on the disk, which tends in a certain direction when the current flows in the ordinary direction; as soon as reverse current appears in the circuit, the turning moment changes, and the disk becomes free to rotate in the direction in which it is impelled by the reverse current, whereas it is prevented from rotating in the other direction by a suitable arrangement such as a stop or pin on the disk. When reverse current is produced in the main circuit, the latter is therefore cut in the manner above described.

Having thus described my invention, what I claim as new therein and desire to secure by Letters Patent, is:—

1. In a circuit closer means to produce an alternating current field, an induction device movable in the field a weight lifted by a plurality of revolutions of said device and circuit terminals closed when the weight has reached its upper limit of movement.

2. In a circuit closer means to produce an alternating current field, an induction disk in said field, an adjustable weight lifted by a plurality of revolutions of said disk and circuit terminals closed by said weight when it has reached its limit of movement.

3. In a circuit closer means to produce an alternating current field, a disk rotatable in the field, an adjustable weight, a suspension therefor connected to said device and circuit closing terminals closed by the weight when lifted, the time of closure being controlled by the length of said suspension.

4. The combination with a main circuit; of a cut-out, a rotatable induction device responsive to variations of current in the main circuit and capable of making a number of revolutions to operate said cut-out, weights suspended from the induction device to adjust the operation of the induction device to currents of different intensity in the main circuit, and an adjustable suspension for the weights to vary the number of revolutions of the device and thereby the time of operating the cut-out after the current has reached the selected intensity, substantially as described.

5. The combination with a main circuit; of a cut-out, an induction device rotatable in a vertical plane and indirectly included in said circuit to operate the cut-out, an adjustable suspended weight to adjust the operation of the induction device to currents of different intensity and means to vary the distance traveled by said weight to vary the number of revolutions of the induction device and thereby the time of operating the switch after the current has reached the selected intensity, substantially as described.

6. The combination with a main circuit; of a circuit closer comprising a field inducing device, a rotating element inductively operated by the field inducing device, electric terminals, a flexible suspension and a weight on said suspension lifted by the rotating element to close circuit between the terminals, substantially as described.

7. The combination with a main circuit; of a circuit closer comprising an electro-magnet, a non-magnetic disk, a spindle therefor, a drum on the spindle, a weight suspended from and adapted to be wound upon the drum, and electric terminals closed by said weight, substantially as described.

8. The combination with a main circuit; of a circuit closer comprising an electro-magnet, a disk, a spindle therefor, a second magnet, said disk operating within the fields of both magnets, a drum on the spindle, a weight suspended from and adapted to be wound upon the drum and terminal contacts closed by said weight, substantially as described.

In testimony whereof I have signed my name to this specification in the presence of two subscribing witnesses.

CHARLES EUGEN LANCELOT BROWN.

Witnesses:
MORITZ VEITH,
A. LIEBERKNECHT.